United States Patent [19]
Rikkinen et al.

[11] Patent Number: 6,132,555
[45] Date of Patent: Oct. 17, 2000

[54] METHOD AND ARRANGEMENT FOR INCREASING EVAPORATION CAPACITY OF A MULTI-STAGE EVAPORATOR OF SPENT LIQUOR IN A PULP MILL

[75] Inventors: Jouko Rikkinen, Kangasala; Tuomo Pokki, Tampere, both of Finland

[73] Assignee: Kvaerner Pulping Oy, Tampere, Finland

[21] Appl. No.: 08/961,180

[22] Filed: Oct. 30, 1997

[30] Foreign Application Priority Data

Nov. 1, 1996 [FI] Finland ................................. 964415

[51] Int. Cl.[7] .............................. B01D 1/26; B01D 1/28; D21C 11/10
[52] U.S. Cl. ......................... 159/47.3; 159/23; 159/24.1; 159/17.2; 159/DIG. 8; 162/16; 162/30.11; 162/47; 162/239
[58] Field of Search .................................. 203/27, 14, 26, 203/24, 71; 159/23, 17.2, 17.1, 24.1, 47.3, DIG. 8; 202/172–174, 235, 182; 162/29, 30.11, 16, 47, 239, 14

[56] References Cited

U.S. PATENT DOCUMENTS

| | | | |
|---|---|---|---|
| 3,763,020 | 10/1973 | Drew et al. ................................ | 203/26 |
| 3,951,753 | 4/1976 | Roller ........................................ | 203/26 |
| 4,284,480 | 8/1981 | Sterlini ...................................... | 203/24 |
| 4,379,734 | 4/1983 | Franzen ................................... | 159/47.1 |
| 5,139,620 | 8/1992 | Elmore et al. ............................. | 203/11 |
| 5,507,141 | 4/1996 | Stigsson ................................ | 162/30.11 |

FOREIGN PATENT DOCUMENTS

| | | |
|---|---|---|
| 0 036 235 | 3/1981 | European Pat. Off. . |
| 36235 | 9/1981 | European Pat. Off. . |
| 0 068 996 | 6/1982 | European Pat. Off. . |
| 0 188 019 | 12/1985 | European Pat. Off. . |
| 84 701 | 5/1982 | Japan . |
| 997501 | 7/1965 | United Kingdom . |
| WO 96/12848 | 5/1996 | WIPO . |

OTHER PUBLICATIONS

European Search Report for EP 97 66 0115.
2–Page Derwent Abstract of EP 97 66 0115.

*Primary Examiner*—Virginia Manoharan
*Attorney, Agent, or Firm*—Rockey, Milnamow & Katz, Ltd.

[57] ABSTRACT

A method and arrangement for increasing evaporation capacity in a multi-stage evaporation plant of spent liquor of a pulp mill. The method includes increasing the pressure of vapor discharged from an evaporation stage by a separate booster, and supplying the vapor having increased pressure to the following evaporation stage. In the arrangement the booster (A–E) is provided in a conduit through which vapor is supplied from one evaporation stage onwards for increasing the pressure of the vapor conducted in the conduit.

9 Claims, 4 Drawing Sheets

METHOD AND ARRANGEMENT FOR INCREASING EVAPORATION CAPACITY OF A MULTI-STAGE EVAPORATOR OF SPENT LIQUOR IN A PULP MILL

FIELD OF THE INVENTION

The invention relates to a method for increasing evaporation capacity in a multi-stage evaporation plant of spent liquor in a pulp mill, wherein each evaporation stage may comprise one evaporation unit or a plurality of evaporation units connected in parallel, said method comprising evaporating water from spent liquor in evaporation units belonging to each evaporation stage in such a way that, in each evaporation unit of a stage, the spent liquor separately supplied to said evaporation unit is heated indirectly with vapor which is supplied thereto and the temperature of which exceeds that of the evaporation unit, said spent liquor boiling at a temperature corresponding to a boiling point, whereby vapor is separated therefrom, said vapor having a lower temperature and lower pressure than the vapor supplied to said evaporation unit for heating, the vapor separated in said evaporation unit being supplied to the following evaporation stage for heating the spent liquor supplied thereto.

The invention further relates to an arrangement for increasing evaporation capacity of a multi-stage evaporation plant of spent liquor in a pulp mill, said evaporation plant comprising a plurality of evaporation stages operating by means of indirect heating, each evaporation stage comprising one evaporation unit or a plurality of evaporation units connected in parallel, conduits for supplying the spent liquor from one evaporation stage to another, and conduits for supplying vapor to the evaporator and correspondingly the vapor separated from the spent liquor in evaporation stages during heating to the following evaporation stage.

BACKGROUND OF THE INVENTION

Evaporation of spent liquors in pulp mills has been carried out by multi-stage evaporators operating by means of fresh vapor, spent vapor, vent gas or flash vapor. The number of stages refers to how many times the vapor boils the liquid before the last condensation. An evaporation unit is usually an apparatus with a separate system of conduits, e.g. heating elements in which vapor supplied to the vapor side condenses and is discharged as condensate. When the vapor condenses, it releases heat, which is conducted through a heat delivery surface to the liquid to be evaporated, which boils at its own boiling temperature, producing vapor. One of such evaporation unit types is a so-called falling film evaporator, in which black liquor is supplied in such a way that it flows down on the surface of the heating elements as a thin film, whereby a high heating effect is achieved. The purpose of evaporation is to remove water from the liquor that is evaporated in order to concentrate it. The operation of a multi-stage evaporation plant which evaporates liquor by fresh vapor or vent gas is based on the fact that energy supplied to the vapor side of the first stage as vapor, vent gas or in some other way boils the liquid on the liquor side, producing thus new vapor the temperature of which is lower than that of the substance producing heat energy, and the vapor thus produced has a lower pressure than the vapor supplied to the vapor side of the heat exchanger. The vapor produced is supplied to the vapor side of the following stage, i.e. the second stage. When the vapor condenses, it releases its heat to the liquor on the liquor side. The liquor heats up and boils, producing thus new vapor, the pressure and temperature of which are lower than those of the vapor supplied to this stage. This is repeated in the third stage, fourth stage, etc., until the pressure and temperature of the vapor discharged from the last stage are so low that technically and economically it is not worth continuing the process. The vapor produced is usually condensed with water or air in a condenser. The number of stages is limited by the pressure of the vapor that is used, the amount of vapor reserved for evaporation, and the size of the heat delivery surfaces of the units.

Since the temperature of the vapor supplied to the evaporation stages decreases constantly, the capacity of the evaporation plant is restricted. In order for the capacity to be increased, it is necessary at present to enlarge the heat delivery surface, i.e. to increase the number of evaporation pipes or elements, which increases the size of the evaporation unit in question. An alternative way to increase the capacity is to add new evaporation units or to change the operating principle of the evaporation units. All these solutions are rather expensive and usually require more space, which is not necessarily available without construction work.

European Patent No. 36 235 discloses an evaporator solution based on the thermo-compressor principle. The heating effect of an evaporation unit is increased by compressing vapor separated from the liquor by means of a vapor compressor to a higher pressure, and by recirculating this vapor to the evaporation unit in which it was separated. In this way, internal vapor circulation is provided in evaporators. According to the European patent, this principle can also be used by connecting a plurality of evaporation units in series, and by supplying the vapor separated in a stage with a lower pressure and temperature back to an evaporation unit having a higher pressure at the other end of the series after being compressed to a higher pressure by a compressor. The drawback of this solution is that, in addition to the necessary compressor, separate expensive evaporation units are required.

It is an object of the present invention to provide a method and arrangement by which the capacity of a multi-stage evaporation plant can be increased in a simple manner and at low costs. The method of the invention is characterized in that the pressure of the vapor which is discharged from at least one evaporation stage and which has been separated from the spent liquor in said stage is increased by a separate booster means, and that the vapor discharged from said booster means is supplied to the following evaporation stage for heating the spent liquor supplied thereto.

SUMMARY OF THE INVENTION

The arrangement of the invention is the method of the invention is characterized in that at least one conduit for supplying the vapor from one evaporation stage onwards is provided with a booster means for increasing the pressure of the vapor before it is supplied to the following stage.

The essential idea of the invention is that vapor separated from spent liquor, usually black liquor, in at least one evaporation stage is compressed by a booster means, such as a compressor or a fan, to a higher pressure, whereafter the vapor having the higher pressure is supplied to the following evaporation stage to heat the spent liquor therein. The total temperature difference of the evaporation plant, available for evaporation grows, and the capacity of the evaporation plant increases almost in a corresponding proportion. According to a preferred embodiment of the invention, a compressor or fan is used in one or more sections between two successive evaporation stages for compressing vapor separated in a preceding evaporation step, in the direction of vapor flow, to a higher pressure in said one or more sections between two successive evaporation stages, and for supplying it to the following evaporation stage, where the vapor separated from the spent liquor may again, if desired, be compressed to a higher pressure and supplied to the following stage. According to yet another preferred embodiment of the invention, the pressure of the vapor is increased at the incoming end of thin liquor, i.e. at the evaporation stages in which the evaporation temperature is rather low in any case. In this case, a relatively great change can be achieved in the temperature difference.

An advantage of the invention is that even a small increase in pressure causes a corresponding increase in the temperature difference, whereby the heating effect and thus the evaporation capacity of the evaporation plant increase considerably. Even a small increase in pressure and a corresponding increase in the temperature difference are significant in view of their effect on the evaporation result of the evaporation plant. In addition, the invention is simple and easy to apply to existing evaporation plants without any expensive construction work and without extra units, since a compressor or fan can be simply and easily provided in a vapor conduit. The costs of the invention are only 20% to 30% of the above-mentioned prior art solution in a thermo-compressor evaporation plant. Correspondingly, the power consumption is lower than in thermo-compressor evaporation plants, since no liquor transfer pumps are needed. Thus, the overall efficiency is much better than in the case of the prior art solutions.

In the following, the invention will be described in greater detail with reference to the accompanying drawings

DETAILED DESCRIPTION OF THE INVENTION

Figure 1:
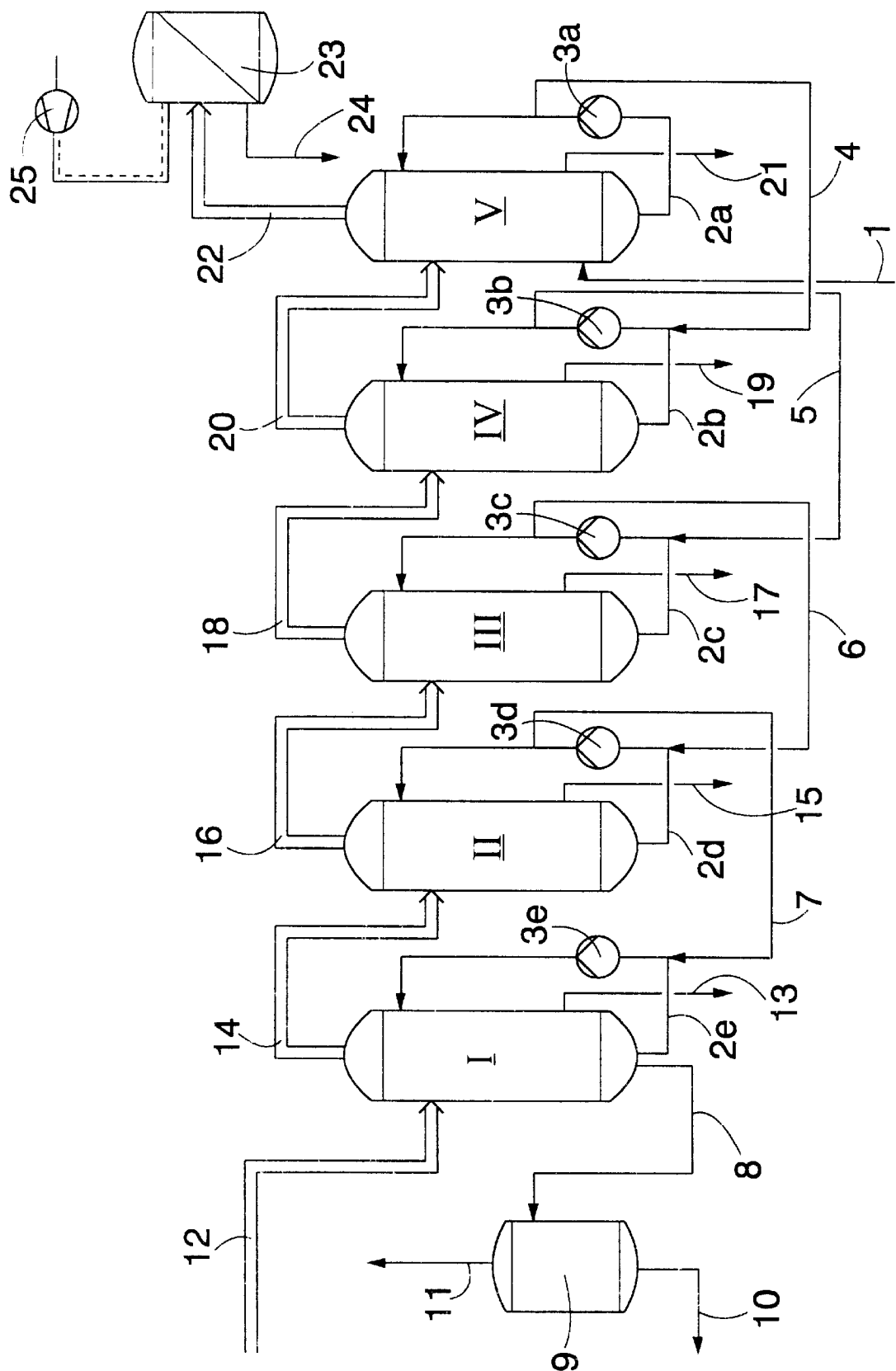
FIG. 1 is a schematic view of a conventional multi-stage evaporation plant of the prior art.

FIG. 1 is a schematic view of a conventional multi-stage evaporation plant comprising a plurality of separate evaporation stages I–V. The evaporation stages I–V are numbered according to the order in which vapor is supplied in series through them. In this patent application and the appended claims, the term 'vapor' refers both to normal pure fresh vapor and to the vent gas which is formed from liquor through evaporation and which comprises mainly vapor but also various substances and impurities separated from the liquor during the evaporation. The evaporation stages I–V may be any known evaporators in which spent liquor, usually black liquor, is heated indirectly by means of heat delivery surfaces or heating elements in such a way that hot vapor is located on one side and spent liquor on the other side of the heat delivery surface. One evaporation stage may comprise one evaporation unit or several evaporation units connected in parallel on the vapor side. These structures and solutions are fully known per se, wherefore they will not be described in greater detail herein. In this case, one evaporation unit represents one evaporation stage, by way of example. When several parallel evaporation units are used, their incoming and outgoing vapor conduits are connected to each other, wherefore they can be regarded operationally as one evaporation stage. The spent liquor is supplied at first through conduit 1 to evaporation stage V. A circulation conduit 2a extends from the lower end of the evaporation unit of evaporation stage V. In the circulation conduit 2a, the spent liquor is recirculated through pump 3a to the upper part of the evaporation unit of evaporation stage V so that it circulates efficiently along the evaporator surfaces. After pump 3a, conduit 4, through which the concentrated spent liquor is conducted to evaporation stage IV, branches from the circulation conduit. Conduit 4 is usually connected to the suction side of pump 3b in the circulation conduit 2b of the spent liquor circulation. From there the spent liquor is arranged to circulate in evaporation stage IV by means of pump 3b. After pump 3b, conduit 5 branches for conducting the further concentrated spent liquor to the spent liquor circulation 2c of evaporation stage III. After pump 3c, conduit 6 extends to the spent liquor circulation 2d of evaporation stage II. Correspondingly, from the liquor circulation of evaporation stage II, comprising pump 3d, the spent liquor is supplied through conduit 7 to the spent liquor circulation 2e of evaporation stage I, whereby pump 3e circulates the spent liquor in evaporation stage I. From evaporation stage I, the spent liquor is supplied through a separate discharge conduit 8 to an expansion tank 9, where its pressure is reduced and water still separates from it as vapor. Thereafter the spent liquor is supplied through conduit 10 in a manner known per se for further treatment or for storage, whereas the vapor is discharged through conduit 11.

Fresh vapor of a pulp mill is supplied to evaporation stage I through conduit 12, whereby it heats the spent liquor and condenses at the same time. Pure fresh vapor condensate is discharged from the lower end of the evaporation unit of evaporation stage I through a separate pure condensate conduit 13. Vapor of about 110° to 125° C. separates from the spent liquor in evaporation stage I. The pressure of the vapor corresponds to its temperature and is over atmospheric pressure. The vapor is supplied through conduit 14 to the following evaporation stage II. The vapor separated from the spent liquor correspondingly condenses in evaporation stage II and is discharged through conduit 15. Vapor of a lower temperature than that of evaporation stage I, i.e. about 90° to 105° C., separates from the spent liquor in evaporation stage II and is supplied to the following evaporation stage III through conduit 16. The condensate of the vapor separated from the spent liquor in evaporation stage III is discharged through conduit 17 at the same time that vapor with a temperature of about 80° to 95° C. separates from the spent liquor in evaporation stage III. The vapor is supplied through conduit 18 to the following evaporation stage IV, in which it once again heats the spent liquor. While releasing heat, the vapor condenses and is discharged as condensate through conduit 19. Vapor with a temperature of about 70° to 80° C., separated from the spent liquor in evaporation stage IV, is supplied through conduit 20 to the following evaporation stage V, where it releases heat for evaporation of the spent liquor, and the condensate that is formed is discharged through conduit 21. Vapor separated from the spent liquor in evaporation stage V is supplied through conduit 22 to a surface condenser 23, from which the condensate that is formed is discharged through conduit 24. The gases that are formed during evaporation of the liquor and that are not condensed but accumulate in the surface condenser are sucked from the surface condenser by a separate underpressure generation means 25 so that the evaporation is not disturbed.

Figure 2:
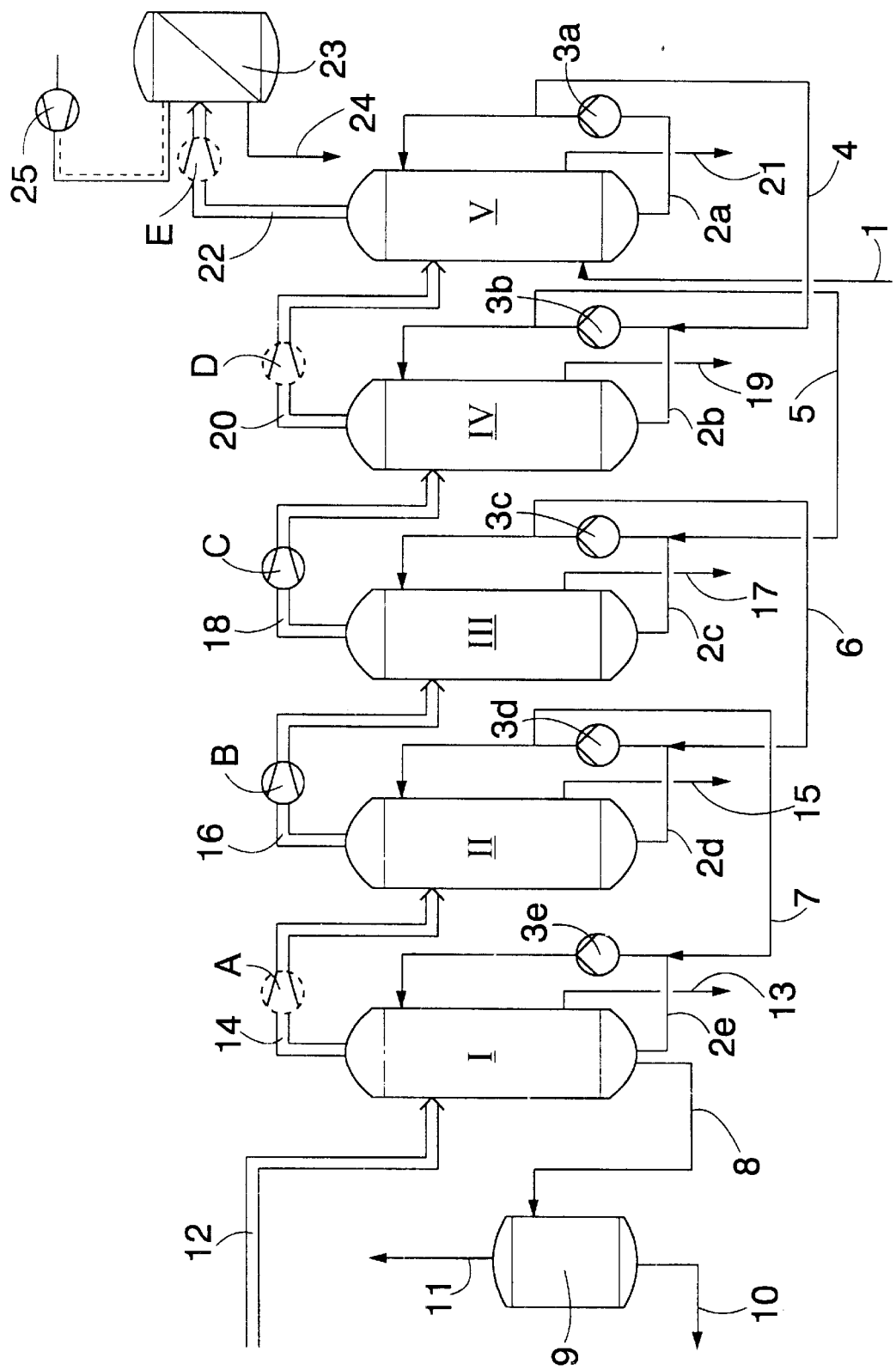
FIG. 2 shows the multi-stage evaporation plant of FIG. 1, provided with apparatuses of the invention.

FIG. 2 is a schematic view of a multi-stage evaporation plant of FIG. 1 in which an embodiment of the invention is applied. According to the invention, the pressure of the vapor conducted from one evaporation stage to another can be increased after one or more evaporation stages by one or more booster means, such as individual fans or compressors or groups of fans or compressors, mounted in conduits 14, 16, 18 or 20 for the evaporated vapor at points A to D. When the pressure of the vapor is increased by the booster means, the temperature of the vapor increases. A temperature increase of even a few degrees increases the evaporation capacity considerably, whereby the capacity of the entire evaporation plant grows. With one fan the temperature increase is 3° to 10° C., with a group of fans it is 8° to 20° C., and when compressors are used, it is even greater. In the case of an evaporation plant of 500 tn/h, for example, if one fan is provided between stages II and III, and if the temperature increase is then about 5.5° C., the effect of the temperature increase on the evaporation capacity is up to 50 tn/h.

A compressor or fan is preferably provided at points B and C, but if desired, even at points A and D, indicated with broken lines. Furthermore, the temperature of the vapor discharged from evaporation stage V may be increased by fan E, indicated in the figure with broken lines. In this case, less cooling water is required for the surface condenser, or the temperature of warm water or other substance to be heated is increased, and/or unit V is allowed to operate at a lower pressure and temperature.

Figure 3:
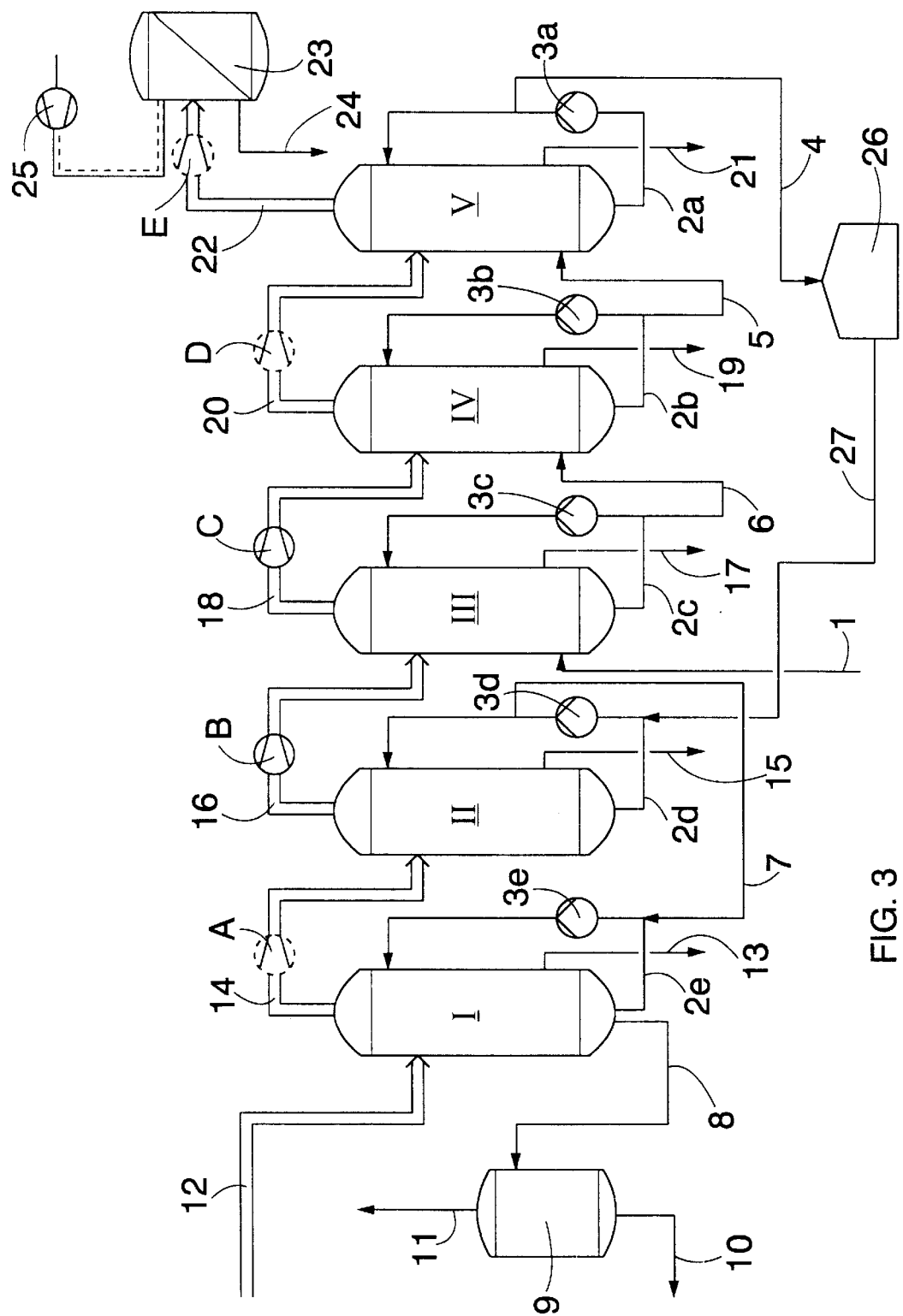
FIG. 3 shows a second multi-stage evaporation plant, provided with apparatuses of the invention.

FIG. 3 is a schematic view of a solution which operationally corresponds to the one of FIG. 2 and in which the flow of fresh vapor, of vapor between the different evaporation stages, and of condensate formed from the vapor is as illustrated in FIG. 1. The flow of the spent liquor to be evaporated differs from FIG. 1 in such a way that, before being supplied to stage II, the spent liquor to be evaporated is supplied through conduit 1 to evaporation stage III, where it is circulated by a circulation pump 3c along circulation conduit 2c, and vapor is formed from the spent liquor, as illustrated in FIG. 1. The concentrated spent liquor is supplied through conduit 6 to evaporation stage IV, where vapor separates from the spent liquor. From evaporation stage IV the further concentrated spent liquor is supplied through conduit 5 to evaporation stage V, where vapor separates from the spent liquor, as in the preceding evaporation stages. The spent liquor concentrated in evaporation stage V is supplied through conduit 4 to a tank 26, from which it is further supplied through conduit 27 to conduit 2d of evaporation stage II, where its treatment continues as illustrated in FIG. 1. If desired, it is also possible to omit the tank 26 and supply the spent liquor from stage V directly to evaporation stage II. As in the case of FIG. 2, booster means, such as fans, fan groups or compressors, can be mounted at points A to E even in the embodiment shown in FIG. 3, depending on the situation, as described in connection with FIG. 2. However, the best efficiency is achieved if they are used at the end of the evaporation plant, e.g. after stage II and/or III, where the temperatures and pressures are the most suitable and can thus be more easily increased.

Figure 4:
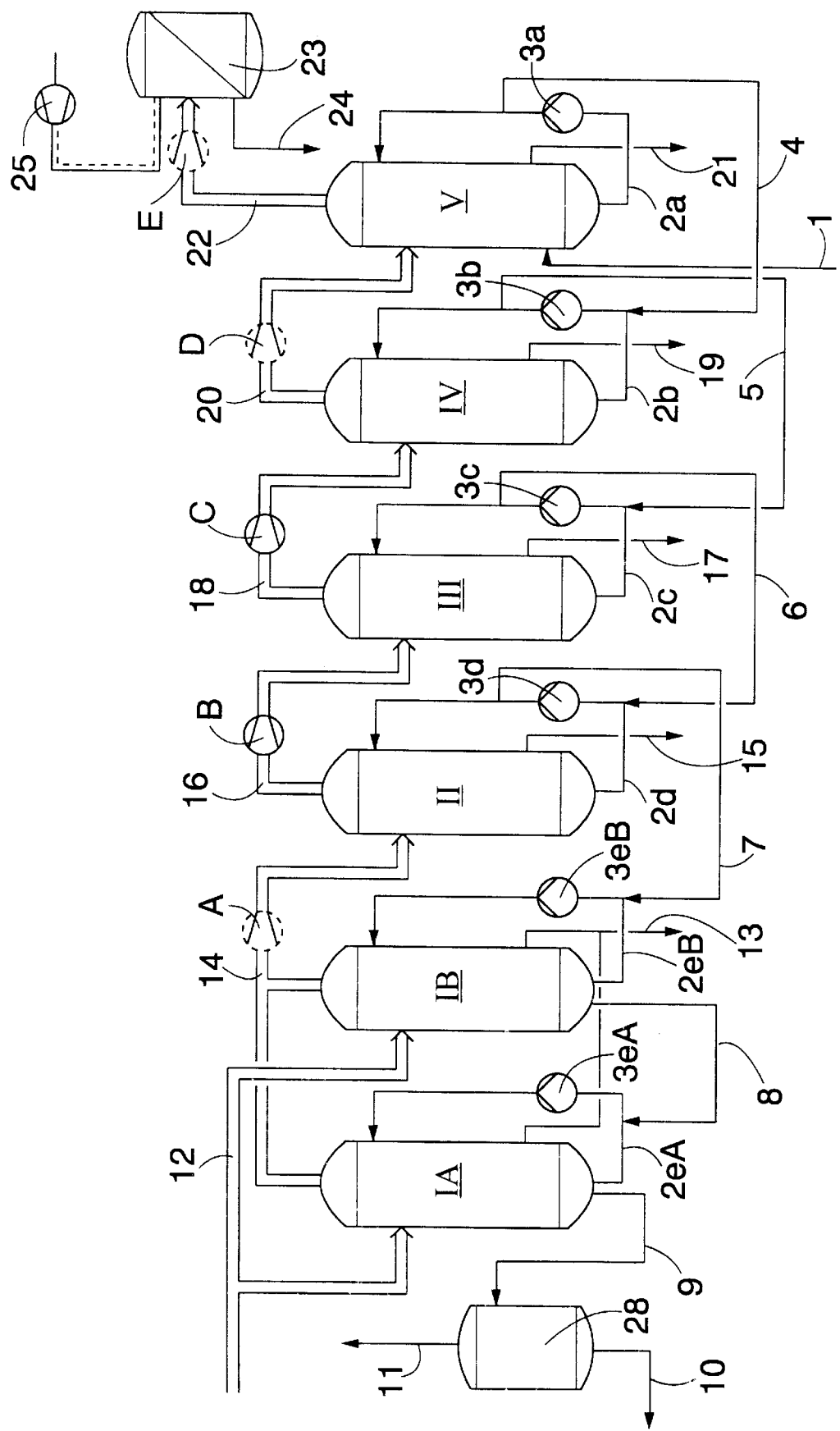
FIG. 4 is a schematic view of a third embodiment of the invention.

In a multi-stage evaporation plant, each evaporation stage may also comprise several units, in which case they are connected in parallel on the vapor sides. Most usually, evaporation stage I is divided into several units for example for process-technical reasons or because of washing requirements. FIG. 4 is a schematical view of an embodiment of the invention in which the first stage consists of two units connected in parallel. This embodiment corresponds to the arrangements illustrated in FIGS. 1 and 2 except for the flows at the first unit: the first stage comprises two units, i.e. IA and IB, instead of one unit. The liquor is supplied to evaporation stage V of the evaporation plant through conduit 1. It is conducted to evaporation stage II as illustrated in FIG. 1, and from the liquor circulation pump 3d in the liquor circulation 2d of evaporation stage II the spent liquor is supplied through conduit 7 to the spent liquor circulation conduit 2eB of unit IB in evaporation stage I. Pump 3eB circulates the spent liquor in unit IB of evaporation stage I. From unit IB, the concentrated spent liquor is supplied through conduit 8 to the spent liquor circulation conduit 2eA of unit IA in evaporation stage I. Pump 3eA circulates the spent liquor in unit IA of evaporation stage I. From unit IA, the spent liquor is supplied through a separate discharge conduit 9 to an expansion tank 28, where the temperature of the spent liquor decreases as its pressure decreases. Water is still separated from the spent liquor as vapor, whereafter the spent liquor is supplied through conduit 10 in a manner known per se for further treatment or to a storage tank, and the vapor discharged from the expansion tank is usually supplied either to a separate condenser or to a vapor conduit or unit having a suitable pressure, where it is condensed.

Fresh vapor of a pulp mill is supplied for evaporation through conduits 12 both to unit IA and to unit IB in evaporation stage I. When the vapor condenses in units IA and IB, it heats the spent liquor, whereby vapor is formed from the liquor in these units and supplied through conduits 14 to unit II of evaporation stage II. The condensate condensed from fresh vapor in units IA and IB is supplied from the units through condensate conduits 13 and discharged from the evaporation plant.

In other respects, such as the liquid and vapor flows, the location of booster means and operation, this embodiment corresponds to the solutions illustrated in FIGS. 1 and 2 and in the specification above.

In the specification above and in the drawings, the invention is described merely by way of example, and it is by no means restricted to this example. The essential feature of the invention is that in a certain evaporation stage, the pressure, and thus even the temperature, of the vapor separated from the spent liquor are increased by a booster means, fan or compressor, and this vapor is supplied to the following evaporation stage to indirectly heat the spent liquor therein, whereby the evaporation capacity of the evaporation plant increases.

What is claimed is:

1. A method for increasing evaporation capacity in a multi-stage evaporation plant of spent liquor in a pulp mill by increasing vapor pressure prior to supplying vapor from one evaporation stage to a subsequent evaporation stage comprising the steps of:

a) heating said spent liquor in a multi-stage evaporation, wherein each evaporation stage may comprise one evaporation unit or a plurality of evaporation units connected in parallel, in said evaporation units of each evaporation stage wherein in each evaporation unit of a stage, spent liquor separately supplied to said evaporation unit is heated indirectly with supply vapor the temperature of said supply vapor exceeding that of the evaporation unit;

b) boiling said spent liquor at a temperature corresponding to a boiling point, whereby vapor is separated therefrom, said vapor having a lower temperature and lower pressure than said supply vapor;

c) increasing the pressure of the vapor separated in step b) by separate booster means, said vapor which is discharged from at least one evaporation stage and which has been separated from the spent liquor in said stage; and then, d) supplying said vapor discharged from said booster means of step c) to the following evaporation stage for heating the spent liquor supplied thereto.

2. A method according to claim 1, wherein the pressure of the vapor discharged from at least two evaporation stages is increased by separate booster means.

3. A method according to claim 1, wherein the pressure is increased at the end of the evaporation plant.

4. A method according to claim 1, wherein said booster means comprises at least one fan.

5. A method according to claim 4, wherein said booster means comprises a group of fans.

6. A method according to claim 1, wherein said booster means comprises a compressor.

7. A method according to claim 6, wherein said booster means comprises a group of compressors.

8. An arrangement for increasing evaporation capacity of a multistage evaporation plant of spent liquor in a pulp mill, said evaporation plant comprising a plurality of evaporation stages operating by means of indirect heating, each evaporation stage comprising one evaporation unit or a plurality of evaporation units connected in parallel, conduits for supplying the spent liquor from one evaporation stage to another, and conduits for supplying vapor to said evaporation unit and correspondingly the vapor separated from the spent liquor in evaporation stages during heating to the following evaporation stage, at least one conduit for supplying the vapor from one evaporation stage onwards being provided with a booster means for increasing the pressure of the vapor before it is supplied to the following stage, wherein said booster means is a fan.

9. An arrangement for increasing evaporation capacity of a multistage evaporation plant of spent liquor in a pulp mill, said evaporation plant comprising a plurality of evaporation stages operating by means of indirect heating, each evaporation stage comprising one evaporation unit or a plurality of evaporation units connected in parallel, conduits for supplying the spent liquor from one evaporation stage to another, and conduits for supplying vapor to said evaporation unit and correspondingly the vapor separated from the spent liquor in evaporation stages during heating to the following evaporation stage, at least one conduit for supplying the vapor from one evaporation stage onwards being provided with a booster means for increasing the pressure of the vapor before it is supplied to the following stage, wherein the booster means consists of a group of fans.

* * * * *